US 6,546,907 B2

(12) United States Patent
Liu et al.

(10) Patent No.: US 6,546,907 B2
(45) Date of Patent: Apr. 15, 2003

(54) FOUR-STROKE CYCLE INTERNAL COMBUSTION ENGINE

(75) Inventors: Yumin Liu, Fussa (JP); Noboru Nagai, Hachioji (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/015,623

(22) Filed: Dec. 17, 2001

(65) Prior Publication Data

US 2002/0073952 A1 Jun. 20, 2002

(30) Foreign Application Priority Data

Dec. 18, 2000 (JP) .................................... 2000-383486

(51) Int. Cl.⁷ ................................................ F01M 1/00
(52) U.S. Cl. .................................................. 123/196 R
(58) Field of Search ........................ 123/196 R, 196 CP, 123/196 M, 572, 41.86

(56) References Cited

U.S. PATENT DOCUMENTS 6,202,613 B1    3/2001   Nagai
6,283,084 B1 *  9/2001   Nagai et al. ............ 123/196 R

FOREIGN PATENT DOCUMENTS

JP           2000-73729         3/2000

* cited by examiner

Primary Examiner—Tony M. Argenbright
Assistant Examiner—Katrina B. Harris
(74) Attorney, Agent, or Firm—Nixon Peabody LLP; Donald R. Studebaker

(57) ABSTRACT

A four-stroke cycle internal combustion engine in which an oil reservoir for storing lubricating oil is arranged below a crank chamber housing a crankshaft, and oil mist formed in the oil reservoir is supplied to the interior of the crank chamber and to a valve chamber through an oil mist passage for providing fluid communication between the oil reservoir and the valve chamber. The oil mist passage includes a pre-separation oil mist passage section formed in the crankshaft, a cylindrical centrifugal-separation chamber surrounding the outer-periphery of the crankshaft, a post-separation oil mist passage section extending from the centrifugal-separation chamber in the opposite direction of the rotational direction of the crankshaft and in fluid communication with the valve chamber, and an oil return passage providing fluid communication between the centrifugal-separation chamber and the oil reservoir.

11 Claims, 4 Drawing Sheets

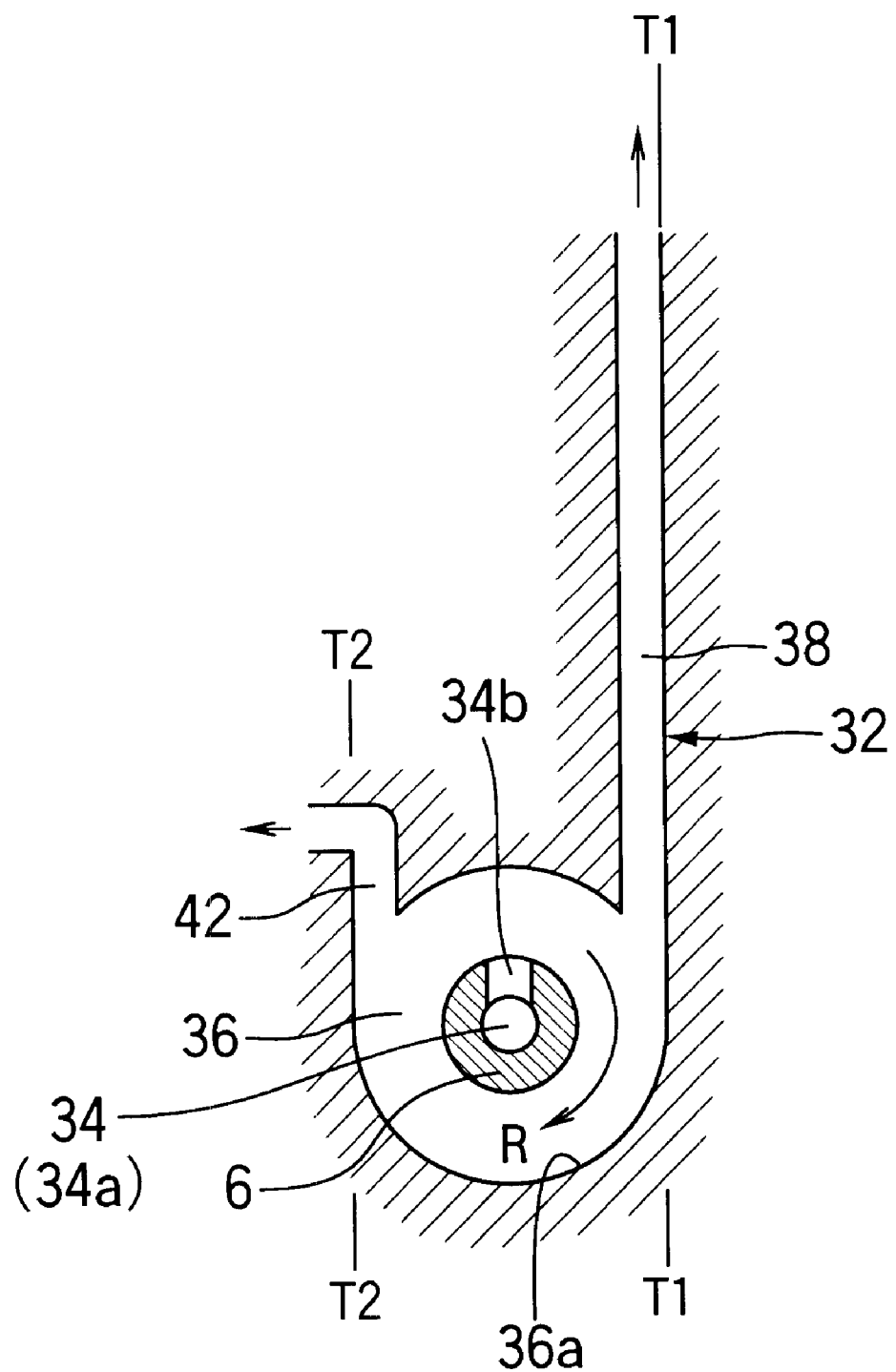

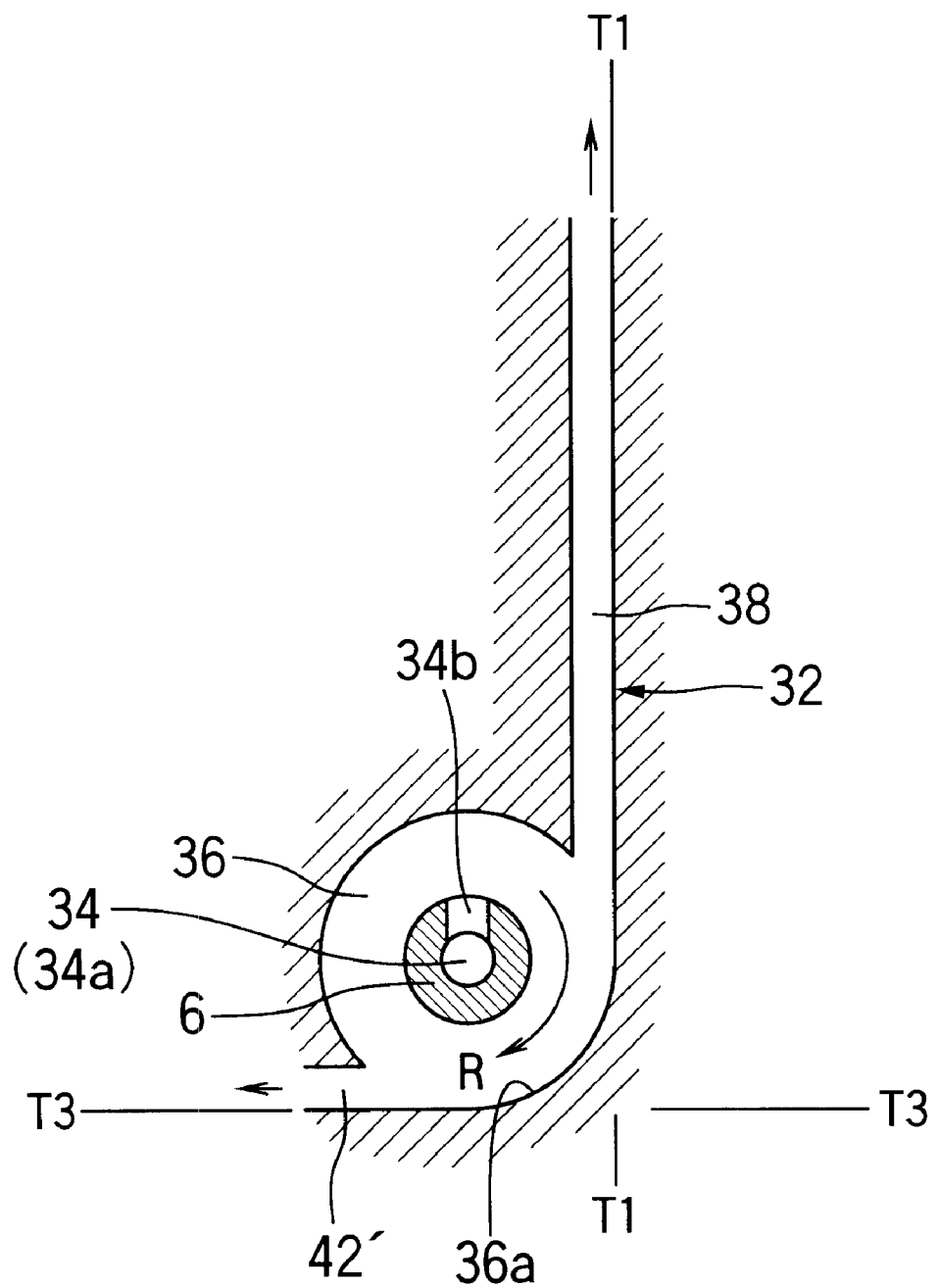

FOUR-STROKE CYCLE INTERNAL COMBUSTION ENGINE

TECHNICAL FIELD

The present invention relates to a four-stroke cycle internal combustion engine, and particularly to a small-size four-stroke cycle internal combustion engine used for hand-held operating machines such as a portable grass trimmer.

BACKGROUND ART

Heretofore, there has been known a four-stroke cycle internal combustion engine in which an oil reservoir chamber for reserving lubricating oil is arranged below a crank chamber having a crankshaft therein, and oil mist formed in the oil reservoir chamber is supplied into an interior of the crank chamber through an opening formed between the oil reservoir chamber and the crank chamber and supplied into a valve chamber through an oil mist passage providing fluid communication between the oil reservoir chamber and a valve chamber.

For example, Japanese Patent Laid-Open Publication No. 2000-73729 (corresponding to U.S. Pat. No. 6,202,613) discloses a four-stroke cycle internal combustion engine comprising a piston, and a connecting rod having a small end coupled to the piston and a crankshaft coupled to a big end of the connecting rod. An oil reservoir chamber for storing lubricating oil is provided below a crank chamber housing the crankshaft and the connecting rod. The crank chamber and the oil reservoir chamber are separated by a partition wall. The big end of the connecting rod is provided with an oil dipper which extends straight downward to splash and atomize the lubricating oil. The partition wall is formed with an opening which allows the oil dipper to swingably move in conjunction with a swing motion of the connecting rod without any interference with the partition wall. Further, a cylinder block is formed with an oil mist passage extending between the oil reservoir chamber and the valve chamber. Additionally, an oil separator chamber is provided above the valve chamber to separate a residual oil after lubricating the valve chamber, and a vertical conduit is formed in the cylinder block to provide fluid communication between the valve chamber and the crank chamber.

Based on the motion of the connecting rod, the oil dipper swings and moves into and out of the oil reservoir chamber through the opening to splash the lubricating oil. This motion generates oil mist. In response to the pressure fluctuation in the crank chamber caused by a reciprocating motion of the piston, the generated oil mist is pushed out of the oil reservoir chamber into the crank chamber, and simultaneously out of the oil reservoir chamber and into the valve chamber through the oil mist passage. Each portion in the crank chamber and the valve chamber is lubricated by the oil mist, and then the residual oil mist is transferred into the oil separator chamber. In the oil separate chamber, the oil mist is condensed in a liquid form of lubricating oil, and returned into the oil reservoir chamber through the vertical conduit and the crank chamber.

Generally, in a high-speed operation of a four-stroke cycle internal combustion engine, the increased temperature of lubricating oil causes its viscosity to be lowered. Thus, in order to maintain a normal operation of the engine, it is necessary to supply an oil mist of high concentration to the crank chamber so as to sufficiently lubricate the piston, connecting rod, crankshaft and the like.

In this case, the oil mist of high concentration supplied to the crank chamber is delivered to the valve chamber through the oil mist passage. However, a cam and other parts in the valve chamber have relatively low necessity for lubricating oil because such parts are not heated as much as those in the crank chamber. The four-stroke cycle internal combustion engine disclosed in the aforementioned Publication advantageously includes the oil separator chamber to separate the oil contained in the residual oil mist of high concentration and return the separated oil to the oil reservoir chamber. However, in view of manufacturing cost and its maintenance, it is desired to provide a four-stroke cycle internal combustion engine having a sufficiently simplified structure. On the other hand, there is another four-stroke cycle internal combustion engine having a breather at the valve chamber. Residual oil mist can be discharged from the breather to a filter, and the filtered air is released to the outside air. In this case, if the oil mist contains a large quantity of oil, the filter will be saturated in a short time, and the oil will not be sufficiently trapped by the filter. This causes an undesirable release of oil mist into the outside air, and increased oil consumption. Further, it is inconveniently required to replace the filter frequently.

SUMMARY OF THE INVENTION

It is therefore an object of the present invention to provide a four-stroke cycle internal combustion engine capable of supplying an adequate amount of lubricating oil to both of a crank chamber and valve chamber thereof.

In order to achieve this object, the present invention provides a four-stroke cycle internal combustion engine, comprising: a crankshaft provided within a crank chamber; an oil reservoir arranged below the crank chamber and for storing lubricating oil; a valve chamber which is in communication with the oil reservoir through an oil mist passage, oil mist being formed in the oil reservoir and supplied to an inside of the crank chamber and to the valve chamber through the oil mist passage; the oil mist passage having a pre-separation oil mist passage section formed in the crankshaft, the pre-separation oil mist passage section being in fluid communication with the oil reservoir at one end and open in a radially outward direction of the crankshaft at the other end; a cylindrical centrifugal-separation chamber surrounding an outer-periphery of the crankshaft where the other end is formed; a post-separation oil mist passage section extending from the centrifugal-separation chamber in the opposite direction of a rotational direction of the crankshaft and in fluid communication with the valve chamber; and an oil return passage in fluid communication with the centrifugal-separation chamber and the oil reservoir, the oil return passage extending from the centrifugal-separation chamber in the same direction as the rotational direction of the crankshaft.

In the present invention, the oil mist formed in the oil reservoir chamber is transferred into the centrifugal-separation chamber through the pre-separation oil mist passage section by a positive pressure in the crank chamber during the downward movement of the piston. The oil mist is discharged from the opening of the crankshaft into the centrifugal-separation chamber, and is then directed to flow in the same direction as the rotational direction of the crankshaft by the rotational movement of the crankshaft. The oil mist flows around the crankshaft along the cylindrical inner-periphery of the centrifugal-separation chamber within the centrifugal-separation chamber. During this stage, among oil particles included in the oil mist, smaller and lighter oil particles are separated from larger and heavier oil particles due to a difference in centrifugal force acting thereon. That is, the smaller and lighter oil particles have a lower inertia force within the centrifugal-separation chamber. Thus, when a positive pressure of the crank chamber is introduced into the centrifugal-separation chamber, a push-out force of the positive pressure overrides the inertia force, and the smaller and lighter oil particles are pushed out of the centrifugal-separation chamber into the post-separation oil mist passage section. Then, the lighter oil particles are supplied to the valve chamber through the post-separation oil mist passage section.

On the other hand, the oil mist of the separated larger oil particles is relatively heavy and thereby has a higher inertia force. Thus, even if the positive pressure of the crank chamber is introduced into the centrifugal-separation chamber, the inertia force will override the push-out force of the positive pressure and most of the larger oil particles remain within the centrifugal-separation chamber without being transferred into the post-separation oil mist passage section. Thus, during the course of the movement in the centrifugal-separation chamber, the oil mist of the larger oil particles move along the inner-periphery of the centrifugal-separation chamber according to the inertia force, and then flows from the centrifugal-separation chamber into the oil return passage extending in the same direction as the rotational direction of the crankshaft, followed by returning into the oil reservoir.

According to the present invention, in the stage before the oil mist is introduced into the valve chamber, the smaller and lighter oil particles among oil particles contained in the oil mist are separated from the larger and heavier oil particles by the centrifugal-separation chamber. Thus, the crank chamber and valve chamber can be supplied with a larger quantity and smaller quantity of lubricating oil, respectively. This allows the crank chamber and valve chamber to be lubricated with an adequate amount of lubricating oil. Furthermore, the centrifugal force of the centrifugal-separation chamber is generated by using the rotational movement of the crankshaft being an existing part. This provides a simplified structure. In addition, since the oil is returned into the oil reservoir through the oil return passage, the lubricating oil can be efficiently utilized.

BRIEF DESCRIPTION OF THE DRAWINGS

FIG. 3 is a partial detail view showing a centrifugal-separation chamber and the vicinity thereof; and FIG. 4 is a partial detail view showing the centrifugal-separation chamber and the vicinity thereof according to another embodiment of the present invention.

DETAILED DESCRIPTION OF THE PREFERRED EMBODIMENT

Various embodiments of a four-stroke cycle internal combustion engine according to the present invention will now be described with reference to the accompanying drawings.

Figure 1:
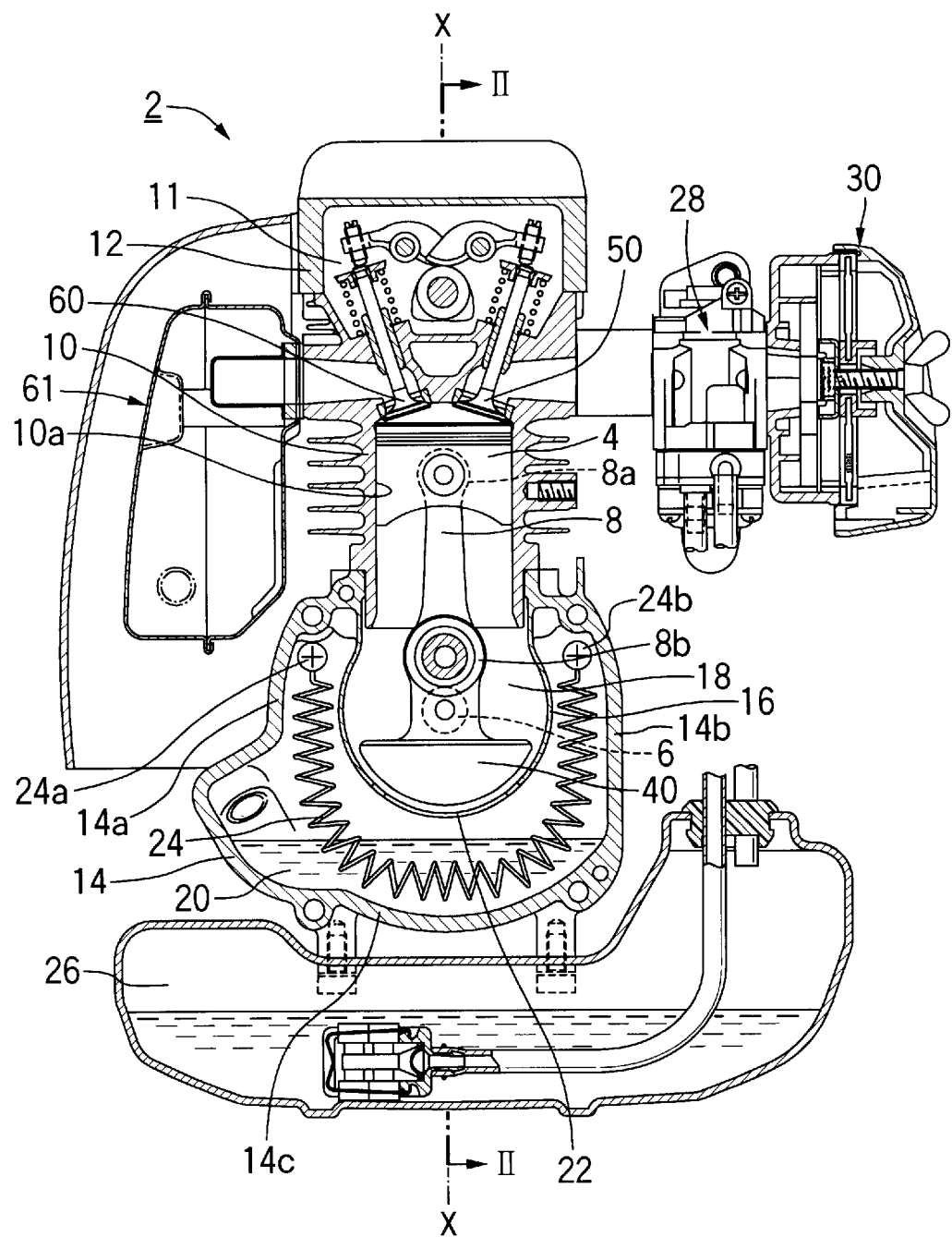
FIG. 1 is a longitudinal sectional view of a four-stroke cycle internal combustion engine according to one embodiment of the present invention.
Figure 2:
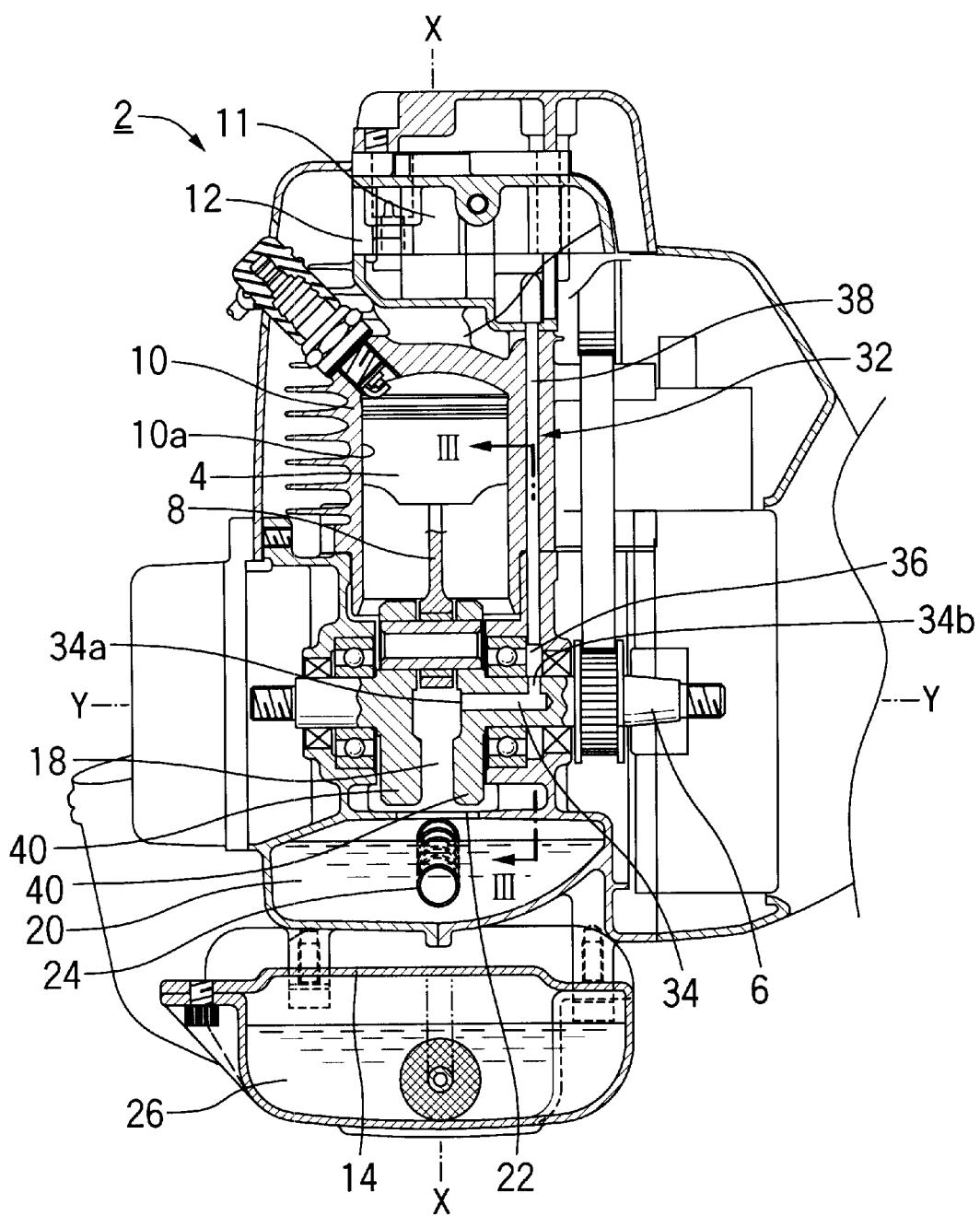
FIG. 2 is a sectional view taken along a line 11—11 of FIG. 1.

With reference to FIGS. 1 and 2, the structure of the four-stroke cycle internal combustion engine according to this embodiment will be described. The four-stroke cycle internal combustion engine 2 according to this embodiment is typically used as a power source, for example, for a portable grass trimmer, whereby it can be operated in an upright position as shown in FIGS. 1 and 2, and in an inclined or inversed position.

The four-stroke cycle internal combustion engine 2 comprises a piston 4 which reciprocates vertically, a crankshaft 6 which is rotationally driven by upward and downward motions of the piston 4, and a connecting rod 8 having a small end 8a at the upper end thereof which is connected to the piston 4 and a big end 8b at the lower end thereof which is connected to the crankshaft 6. The four-stroke cycle internal combustion engine 2 also includes a cylinder block 10 formed with a cylinder bore 10a allowing the piston 4 to reciprocate therein, a cylinder head 12 provided on an upper side of the cylinder block 10 and formed with a valve chamber 11 therein, and a block body 14 surrounding the crankshaft 6. The block body 14 includes a left sidewall 14a, a right sidewall 14b and a bottom wall 14c which are integrally formed to surround the crankshaft 6. The interior space of the block body 14 is divided into two chambers by a partition wall 16 which extends at a certain distance from the walls 14a, 14b, 14c of the block body 14 and surrounds the right, left and lower sides of the crankshaft 6.

More specifically, a space inside the partition wall 16 is defined as a crank chamber 18 housing the crankshaft 6 and the connecting rod 8, and a space outside the partition wall 16 is defined as a generally U-shaped oil reservoir chamber 20 for storing lubricating oil.

The partition wall 16 has a slit-shaped opening 22 formed symmetrically with respect to an axis X—X of the connecting rod 8 and the cylinder bore 10, so as to allow oil mist formed in the oil reservoir chamber 20 to flow into the crank chamber 18. On the other hand, in case that the four-stroke cycle internal combustion engine 2 is used in an inclined or inversed position, the partition wall 16 and the opening 22 will be designed in an adequate shape and size to prevent the lubricating oil stored in the oil reservoir chamber 20 from flowing into the crank chamber 18. A coil spring member 24 is disposed in the oil reservoir chamber 20 as an oil mist forming device. The coil spring member 24 is suspended by attaching both ends 24a, 24b thereof to right and left sides on the upper end of the oil reservoir chamber 20, so as to form a U-shape along the U-shaped oil reservoir chamber 20 over the entire area of the oil reservoir chamber 20. As shown in FIGS. 1 and 2, in the illustrated upright position of the four-stroke cycle internal combustion engine 2, the lower portion of the coil spring member 24 is immersed into the lubricating oil stored in the oil reservoir chamber 20

A fuel tank 26 is disposed under the block body 14. A carburetor 28 and an air cleaner 30 are disposed on the side of an intake valve 50 provided in the cylinder head 12, and a muffler 61 is disposed to the side of an exhaust valve 60.

The four-stroke cycle internal combustion engine 2 according to the embodiment of the present invention is also formed with an oil mist passage 32 providing fluid communicating between the crank chamber 18 and the valve chamber 11. The oil mist passage 32 allows the oil mist formed in the oil reservoir chamber 20 to be transferred into the valve chamber 11. More specifically, the oil mist passage 32 includes a pre-separation oil mist passage section 34 formed within the crankshaft 6, a centrifugal-separation chamber 36 provided around the crankshaft 6 and in fluid communication with the pre-separation oil mist passage section 34, and a post-separation oil mist passage section 38 providing fluid communicating between the centrifugal-separation chamber 36 and the valve chamber 11.

The pre-separation oil mist passage section 34 has a first hole 34a opened to the crank chamber 18 at one end thereof and a second hole 34b formed in a radial outer-periphery of the crankshaft 6 at the other end thereof. The pre-separation oil mist passage section 34 first extends from the first hole 34a along an axis Y—Y of the crankshaft 6. Then, in the vicinity of the second hole 34b, the pre-separation oil mist passage section 34 turns in the radial outward direction of the crankshaft 6 and extends up to the second hole 34b so as to form an L-shape as a whole. The crankshaft 6 includes a pair of counterweights 40 spaced apart from and oppose to each other. As shown in FIG. 2, the first hole 34a is opened toward a space of the crank chamber 18 formed between the counterweights 40. As can be seen from FIGS. 2 and 3, the centrifugal-separation chamber 36 has a cylindrical shape along the axis Y—Y and surrounds the outer-periphery of the crankshaft 6 in the region formed with the second hole 34b. On one side of the crankshaft 6, the post-separation oil mist passage section 38 extends along a line(T1) tangent to an inner-periphery of the centrifugal-separation chamber 36. More specifically, the post-separation mist passage section 38 extends straight upward to the valve chamber 11 in the direction of the tangent T1—T1 to the inner-periphery 36a of the centrifugal-separation chamber 36 and in the opposite direction of the rotational direction R of the crankshaft 6.

The four-stroke cycle internal combustion engine 2 also includes an oil return passage 42 providing fluid communication between the centrifugal-separation chamber 36 and the crank chamber 18 and/or between the centrifugal-separation chamber 36 and the oil reservoir chamber 20. The oil return passage 42 extends along a line(T2) tangent to the inner-periphery 36a of the centrifugal-separation chamber 36. More specifically, the oil return passage 42 is located at an opposite side of the post-separation oil mist passage section 38 with respect to the crankshaft 6, and extends upwardly in a direction of the tangent T2—T2 to the inner-periphery 36a of the centrifugal-separation chamber 36 and in the same direction as the rotational direction R of the crankshaft 6. Further, the oil return passage 42 extends laterally to the crank chamber 18 so as to form an inversed L-shape as a whole.

The centrifugal-separation chamber 36, the post-separation oil mist passage section 38 and the oil return passage 42 are formed in the cylinder block 10 and/or the block body 14.

The four-stroke cycle internal combustion engine 2 according to this embodiment operates as follows.

Once the four-stroke cycle internal combustion engine 2 is started, the piston 4 moves vertically. This upward and downward motion of the piston 4 cause vibrations, whereby an entire oil surface of the lubricating oil in the oil reservoir chamber 20 waves. This wave of the oil surface is encouraged by vibration of the coil spring member 24 which is induced by vibration of the four-stroke cycle internal combustion engine 2. As described above, the coil spring member 24 is arranged over the entire area of the oil reservoir chamber 20. Thus, even if the four-stroke cycle internal combustion engine 2 is used, for example, in an inclined or inversed position, the vibration of the coil spring member 24 excited by the vibration of the four-stroke cycle internal combustion engine 2 allows the lubricating oil in the oil reservoir chamber 20 to be atomized forming mist-like oil.

The oil mist flows into the crank chamber 18 through the slit-like opening 22 formed in the partition wall 16 in response to a negative pressure caused in the crank chamber 18 by the upward motion of the piston 4. Subsequently, the downward motion of the piston 4 causes a positive pressure in the crank chamber 18. In response to this positive pressure, the oil mist in the crank chamber 18 flows into the first hole 34a, and is pushed out of the second hole 34b into the centrifugal-separation chamber 36 through the pre-separation oil mist passage section 34. The oil mist pushed out into the centrifugal-separation chamber 36 is directed by a rotational movement of the crankshaft 6 so as to flow around the crankshaft 6 in the same direction as the direction of rotation R of the crankshaft 6 along the inner-periphery 36a of the centrifugal-separation chamber 36. During this stage, among oil particles included in the oil mist, smaller and lighter oil particles are separated from larger and heavier oil particles.

That is, within the centrifugal-separation chamber 36, the smaller and lighter oil particles have a lower inertia force. Thus, when the crank chamber 18 has a positive pressure, the push-out force of the positive pressure overrides the inertia force, whereby the smaller and lighter oil particles are pushed out into the post-separation oil mist passage section 38. These lighter oil particles are supplied to the valve chamber 11 through the post-separation oil mist passage section 38. On the other hand, the separated larger oil particles of the oil mist are relatively heavy and have a higher inertia force. Thus, even if the positive pressure of the crank chamber 18 is introduced into centrifugal-separation chamber 36, the inertia force overrides the push-out force of the positive pressure, whereby most of the larger oil particles keep moving along the inner-periphery 36a of the centrifugal-separation chamber 36 without being transferred into the post-separation oil mist passage section 38. During the movement within the centrifugal-separation chamber 36, the oil mist of larger oil particles moves along the inner-periphery 36a of the centrifugal-separation chamber 36 according to the inertia force. Then, this oil mist flows into the oil return passage 42, and moves upward. Thus, an adequate quantity of oil mist is returned to the crank chamber 18. Accordingly, parts in the crank chamber 18 are lubricated not only by newly formed oil mist in the oil reservoir chamber 20 but also by the returned oil mist.

Subsequently, when the crank chamber 18 has a negative pressure caused by the upward motion of the piston 4, the lighter mist is returned to an upstream side of the post-separation passage section 38. However, even if the negative pressure is introduced into the centrifugal-separation chamber 36, the heavier mist is not returned to the upstream side of the oil return passage 42 because of its higher inertia force, and the heavier mist flows to the downstream side of the oil return passage 42 according to the inertia force to return to the crank chamber 18.

The four-stroke cycle internal combustion engine 2 has a displacement of about 30 mL and an idling speed of about 3,000 rpm. In a high speed range (about 10,000 rpm) as well as a low speed range during an idling operation, the four-stroke cycle internal combustion engine 2 according to this embodiment operates as described above.

FIG. 4 illustrates a partial detail view showing a centrifugal-separation chamber and the vicinity thereof according to another embodiment.

This embodiment shown in FIG. 4 has substantially the same structure as that of the four-stroke cycle internal combustion engine 2 shown in FIGS. 1 to 3 except that the structure of an oil return passage 42' for returning the separated oil from the centrifugal-separation chamber 36 of this embodiment is different from the oil return passage 42 of the four-stroke cycle internal combustion engine 2 shown in FIGS. 1 to 3. Thus, the same elements or components will be defined by the same numerals, and only the oil return passage 42' will be described.

As shown in FIG. 4, the oil return passage 42' in this embodiment extends from a position under the crankshaft 6, or from the bottom portion of the centrifugal-separation chamber 36 in line with a tangent T3 to the inner-periphery 36a of the centrifugal-separation chamber 36. More specifically, the oil return passage 42' extends laterally straight to the crank chamber 18 in the direction of a tangent T3—T3 to the inner-periphery 36a of a bottom portion of the centrifugal-separation chamber 36 and in the same direction as the rotational direction R of the crankshaft 6. Since the four-stroke cycle internal combustion engine 2 as shown in FIG. 4 operates in the same manner as the four-stroke cycle internal combustion engine 2 shown in FIGS. 1 to 3 as described above, the description of the operation will be omitted.

It should be appreciated that in the four-stroke cycle internal combustion engine 2 shown in FIGS. 1 to 4, the post-separation oil mist passage section 38 extends in line with the tangent T1 to the inner-periphery 36a of the centrifugal-separation chamber 36. This enables a sufficient quantity of the lighter oil mist separated in the centrifugal-separation chamber 36 to flow into the post-separation oil mist passage section 38. However, as long as the post-separation oil mist passage section 38 extends in a direction opposite from the rotational direction R of the crankshaft 6, the post-separation oil mist passage section 38 does not necessarily need to extend in line with the tangent T1 (or be located on the tangent) to the inner-periphery 36a of the centrifugal-separation chamber 36. For example, the position of the post-separation oil mist passage section 38 in FIGS. 3 and 4 may be shifted radially inward in a parallel shift manner with a shift limit at a position which is tangent to the outer-periphery of the crankshaft 6. In the position shifted radially inward from the tangent T1, the quantity of the oil mist flowing into the post-separation oil mist passage section 38 is reduced. Thus, the position of the post-separation oil mist passage section 38 may be determined depending on the quantity of lubricating oil required for the valve chamber 11. In the four-stroke cycle internal combustion engine 2, the oil return passage 42 or 42' extends in the line with the tangent T2 or T3 to the inner-periphery 36a of the centrifugal-separation chamber 36. This advantageously enables a sufficient quantity of the heavier mist separated in the centrifugal-separation chamber 36 to flow into the oil return passage 42, 42'. However, as long as the oil return passage section 42 or 42' extends in the same direction as the rotational direction R of the crankshaft 6, the oil return passage section 42 or 42' does not necessarily need to extend in line with the tangent T2 or T3 (or be located on the tangent) to the inner-periphery of the centrifugal-separation chamber 36. For example, the oil return passage section 42 or 42' in FIGS. 3 and 4 may be sifted laterally in FIG. 3, or upward in FIG. 4, in a parallel shift manner with placing the limit at a position corresponding to a tangent to the outer-periphery of the crankshaft 6.

Further, as shown in FIGS. 1 to 4, the post-separation mist passage section 38 extends upwardly from the centrifugal-separation chamber 36 to the valve chamber 11 located in the upper side of the centrifugal-separation chamber 36 taking the shortest path. However, as long as the post-separation oil mist passage section 38 extends in the opposite direction as the rotational direction R of the crankshaft 6, the post-separation oil mist passage section 38 may extend from the centrifugal-separation chamber 36 in any of an upward, downward, right and left directions. Further, as long as the oil return passage 42 or 42' extends in the same direction to the rotational direction R of the crankshaft 6, the oil return passage 42 or 42' may extend from the centrifugal-separation chamber 36 in any of an upward, downward, right and left direction.

Further, the oil return passage 42 or 42' shown in FIGS. 1 to 4 advantageously has the ends opened to the crank chamber 18 to allow the parts within the crank chamber 18 to be lubricated by the returned lubricating oil. However, the ends may be opened to the oil reservoir chamber 20.

Further, in the four-stroke cycle internal combustion engine 2 shown in FIGS. 1 to 4, the centrifugal-separation chamber 36 and the post-separation oil mist passage section 38 are formed in the cylinder block 10 and/or block body 14. This is advantageous to provide a simplified structure and easy assembling and prevent the overall size from being enlarged as compared to conventional engines. However, they may be formed by using any suitable separate part.

Further, in the four-stroke cycle internal combustion engine 2 shown in FIGS. 1 to 4, the pre-separation oil mist passage section 34 extends along the axis Y—Y of the crankshaft 6. However, as long as the pre-separation oil mist passage section 34 has one end in fluid communication with the centrifugal-separation chamber 36 and is formed to open in the radial outer-periphery of the crankshaft 6, and the other end in fluid communication with either one of the crank chamber 18 or the oil reservoir chamber 20, the pre-separation oil mist passage section 34 may be formed in any other portion of the crankshaft 6.

Further, in the four-stroke cycle internal combustion engine 2 shown in FIGS. 1 to 4, the lubricating oil in the oil reservoir chamber 20 is atomized in the form of mist by using the coil spring member 24. Alternatively, the lubrication oil may be atomized in the form of mist by using a known oil dipper which extends downwardly straight from the big end 8b of the connecting rod 8.

It is further apparent that the present invention may be applied to general four-cycle engines without the partition wall 16, whereby the same function and effect can be obtained.

As described above, the present invention can provide a four-stroke cycle internal combustion engine capable of supplying oil mist of high concentration into a crank chamber and oil mist of low concentration into a valve chamber.

It is to be understood that the present invention is not limited to the aforementioned embodiments, and various modifications can be made without departing from the sprit and scope of the present invention indicated by the appended claims. Therefore, it is intended that such modifications are encompassed within the scope of the present invention.

What is claimed is:

1. A four-stroke cycle internal combustion engine, comprising:

a crankshaft provided within a crank chamber;

an oil reservoir arranged below said crank chamber for storing lubricating oil;

a valve chamber in communication with said oil reservoir through an oil mist passage, oil mist being formed in said oil reservoir and supplied to an inside of said crank chamber and to said valve chamber through said oil mist passage;

wherein said oil mist passage comprises a pre-separation oil mist passage section formed in said crankshaft, said pre-separation oil mist passage section being in fluid communication with said oil reservoir at one end and said crankshaft at another end; a cylindrical centrifugal-separation chamber surrounding an outer-periphery of said crankshaft where said other end is formed; a post-separation oil mist passage section extending from said centrifugal-separation chamber in an opposite direction of a rotational direction of said crankshaft, said post-separation oil mist passage section being in fluid communication with said valve chamber at one end and said centrifugal-separation chamber at another end; and an oil return passage in fluid communication with said centrifugal-separation chamber and said oil reservoir, said oil return passage extending from said centrifugal-separation chamber in the same direction as the rotation direction of said crankshaft.

2. A four-stroke cycle internal combustion engine as recited in claim 1, wherein said oil return passage extends along a line which is tangent to an inner-periphery of said centrifugal-separation chamber.

3. A four-stroke cycle internal combustion engine as recited in claim 1, wherein said post-separation oil mist passage section extends along a line which is tangent to an inner-periphery of said centrifugal-separation chamber.

4. A four-stroke cycle internal combustion engine as recited in claim 1, wherein said oil return passage has a downstream end which is in fluid communication with said crank chamber.

5. A four-stroke cycle internal combustion engine as recited in claim 1, wherein said centrifugal-separation chamber, post-separation oil mist passage section and oil return passage are formed in at least one of a cylinder block and a block body.

6. A four-stroke cycle internal combustion engine as recited in claim 2, wherein said post-separation oil mist passage section extends along a line which is tangent to an inner-periphery of said centrifugal-separation chamber.

7. A four-stroke cycle internal combustion engine as recited in claim 2, wherein said oil return passage has a downstream end which is in fluid communication with said crank chamber.

8. A four-stroke cycle internal combustion engine as recited in claim 3, wherein said oil return passage has a downstream end which is in fluid communication with said crank chamber.

9. A four-stroke cycle internal combustion engine as recited in claim 2, wherein said centrifugal-separation chamber, post-separation oil mist passage section and oil return passage are formed in at least one of a cylinder block and a block body.

10. A four-stroke cycle internal combustion engine as recited in claim 3, wherein said centrifugal-separation chamber, post-separation oil mist passage section and oil return passage are formed in at least one of a cylinder block and a block body.

11. A four-stroke cycle internal combustion engine as recited in claim 4, wherein said centrifugal-separation chamber, post-separation oil mist passage section and oil return passage are formed in at least one of a cylinder block and a block body.

* * * * *